United States Patent
Park et al.

(10) Patent No.: US 12,431,508 B2
(45) Date of Patent: Sep. 30, 2025

(54) SOLID OXIDE FUEL CELLS AND METHOD OF MANUFACTURING THE SAME

(71) Applicant: MICO POWER LTD., Anseong-si (KR)

(72) Inventors: Jin Ah Park, Anseong-si (KR); Song Ho Choi, Anseong-si (KR); Jin Su Park, Anseong-si (KR)

(73) Assignee: MICO POWER LTD., Anseong-si (KR)

( * ) Notice: Subject to any disclaimer, the term of this patent is extended or adjusted under 35 U.S.C. 154(b) by 0 days.

(21) Appl. No.: 18/964,299

(22) Filed: Nov. 29, 2024

(65) Prior Publication Data

US 2025/0174673 A1 May 29, 2025

(30) Foreign Application Priority Data

Nov. 29, 2023 (KR) .......................... 10-2023-0169128

(51) Int. Cl.
| | | |
|---|---|---|
| *H01M 4/86* | (2006.01) | |
| *H01M 4/88* | (2006.01) | |
| *H01M 4/90* | (2006.01) | |
| *H01M 8/0232* | (2016.01) | |
| *H01M 8/0245* | (2016.01) | |
| *H01M 8/12* | (2016.01) | |

(52) U.S. Cl.
CPC ....... *H01M 4/8657* (2013.01); *H01M 4/8803* (2013.01); *H01M 4/8828* (2013.01); *H01M 4/8885* (2013.01); *H01M 4/9033* (2013.01); *H01M 8/0232* (2013.01); *H01M 8/0245* (2013.01); *H01M 2004/8689* (2013.01); *H01M 2008/1293* (2013.01)

(58) Field of Classification Search
None
See application file for complete search history.

(56) References Cited

U.S. PATENT DOCUMENTS

2008/0003477 A1* 1/2008 Akikusa .................... C22C 5/08
429/479
2015/0270558 A1* 9/2015 Wood .................. H01M 8/0247
429/468

FOREIGN PATENT DOCUMENTS

| CN | 109921079 A | 6/2019 |
|---|---|---|
| JP | H067564 Y2 | 2/1994 |
| JP | 2010-272499 A | 12/2010 |
| JP | 2016009649 * | 1/2016 |
| JP | 2017-010710 A | 1/2017 |
| KR | 10-2004-0002847 A | 1/2004 |
| KR | 10-2007-0037254 A | 4/2007 |

OTHER PUBLICATIONS

Machine translation of JP 2010272499, Dec. 2010.*
Korean Patent Office Notice of Allowance for KR10-2023-0169128 B1, Issue on Sep. 9, 2024.
Korean Patent Office Office Action for KR10-2023-0169128 B1, Issued on Jan. 4, 2024.

* cited by examiner

*Primary Examiner* — Jonathan Crepeau
(74) *Attorney, Agent, or Firm* — NKL Law; Jae Youn Kim

(57) ABSTRACT

A solid oxide fuel cell includes a solid oxide electrolyte layer, an anode electrode layer placed on a first surface of the solid oxide electrolyte layer, a first cathode electrode layer placed on a second surface of the solid oxide electrolyte layer, and a second cathode electrode layer placed on the first cathode electrode layer and having lower hardness than the first cathode electrode layer.

6 Claims, 3 Drawing Sheets

SOLID OXIDE FUEL CELLS AND METHOD OF MANUFACTURING THE SAME

CROSS-REFERENCE TO RELATED APPLICATION

This application is based on and claims priority under 35 U.S.C. § 119 to Korean Patent Application No. 10-2023-0169128, filed on Nov. 29, 2023, in the Korean Intellectual Property Office, the disclosure of which is incorporated by reference herein in its entirety.

BACKGROUND

The present disclosure relates to solid oxide fuel cells that generate electric energy by the reaction of hydrogen and oxygen and a method of manufacturing the solid oxide fuel cells.

Solid oxide fuel cells operate at a high temperature of about 600° C. to about 1000° C., have many advantages, such as being the most efficient and least pollution among various types of fuel cells, and not only do not require a fuel reformer but also allows combined power generation.

The solid oxide fuel cells may each be largely divided into a flat plate shape, a cylindrical shape, and a flat tubular shape. A solid oxide fuel cell of a flat plate shape has an advantage of higher power density of a stack itself than a solid oxide fuel cell of a cylindrical shape or a flat tubular shape, thereby being most widely used.

The solid oxide fuel cell of a flat plate shape is generally used in the form of a fuel cell stack in which multiple single cells are stacked by using metal separators. The fuel cell stack is required to improve the performance of the fuel cell stack by reducing the contact resistance through uniform contact between an electrode of the single cell formed of ceramic and the metal separator.

In addition, when cracks are generated in the ceramic single cell during a pressurization process that is essential in the process of manufacturing the fuel cell stack, the cracks affect a significant negative impact on the performance and stability of the fuel cell stack, and accordingly, the development of technology for preventing the cracks from being generated is required.

Also, the fuel cell stack operates at a high temperature of about 600° C. to about 800° C., and when chromium (Cr) diffuses into a single cell through metal components that constitute the fuel cell stack, the performance of the single cell decreases rapidly, and accordingly, the development of a fuel cell stack that may appropriately capture chromium is required.

SUMMARY

The present disclosure provides a solid oxide fuel cell that may have improved chromium capture capability, prevent cracks from being generated in a single cell during a manufacturing process, and increase performance due to improved contact characteristics with a separator.

Also, the present disclosure provide a method of manufacturing a solid oxide fuel cell.

According to an aspect of the present disclosure, a solid oxide fuel cell includes a solid oxide electrolyte layer, an anode electrode layer placed on a first surface of the solid oxide electrolyte layer, a first cathode electrode layer placed on a second surface of the solid oxide electrolyte layer, and a second cathode electrode layer placed on the first cathode electrode layer and having lower hardness than the first cathode electrode layer.

In one embodiment, the solid oxide fuel cell may further include a current collecting member placed on the second cathode electrode layer and in contact with the second cathode electrode layer.

In one embodiment, the first cathode electrode layer may be formed of any one of $La_{0.58}Sr_{0.4}Co_{0.2}Fe_{0.8}O_{3-\delta}$ (LSCF) and $La_{1-x}Sr_xMnO_3$ (LSM), and the second cathode electrode layer may be formed of $La_{0.6}Sr_{0.4}CoO_{3-\delta}$ (LSC).

In one embodiment, the first cathode electrode layer may have Vickers hardness of 48 to 57 under conditions of a load of 0.01 kgf and a holding time of 10 seconds, and the second cathode electrode layer may have Vickers hardness of 10 to 20.

In one embodiment, at least a part of the current collecting member may be buried in the second cathode electrode layer.

In one embodiment, the current collecting member may include a separation plate, and at least a part of the separation plate may be buried inside the second cathode electrode layer.

In one embodiment, the current collecting member may include a separation plate and a current collecting mesh structure placed between the separation plate and the second cathode electrode layer, and at least a part of the current collecting mesh structure may be buried in the second cathode electrode layer.

In one embodiment, the current collecting member may include a metal member and a coating layer coated on at least a region of a surface of the metal member which faces the second cathode electrode layer, and the coating layer may be formed of the same material as the second cathode electrode layer.

In one embodiment, hardness of the coating layer may be 0.7 to 1.2 times hardness of the second cathode electrode layer.

In one embodiment, the current collecting member may further include a chromium capture layer formed between the metal member and the coating layer.

According to another embodiment of the present disclosure, a method of manufacturing a solid oxide fuel cell includes forming a stack structure in which an anode electrode layer, a solid oxide electrolyte layer, and a first cathode electrode layer are stacked, forming a cathode slurry layer by applying cathode slurry on a surface of the first cathode electrode layer, and forming a second cathode electrode layer by pre-sintering the cathode slurry layer.

In one embodiment, the cathode slurry may include $La_{0.6}Sr_{0.4}CoO_{3-\delta}$ (LSC) powder.

In one embodiment, the pre-sintering of the cathode slurry layer may be performed to have density of 80% to 95% of theoretical density for sintering at a sintering temperature.

In one embodiment, the method of manufacturing the solid oxide fuel cell may further include placing a current collecting member on the second cathode electrode layer and pressurizing the current collecting member.

BRIEF DESCRIPTION OF THE DRAWINGS

Embodiments of the inventive concept will be more clearly understood from the following detailed description taken in conjunction with the accompanying drawings in which.

DETAILED DESCRIPTION OF THE EMBODIMENTS

Figure 1:
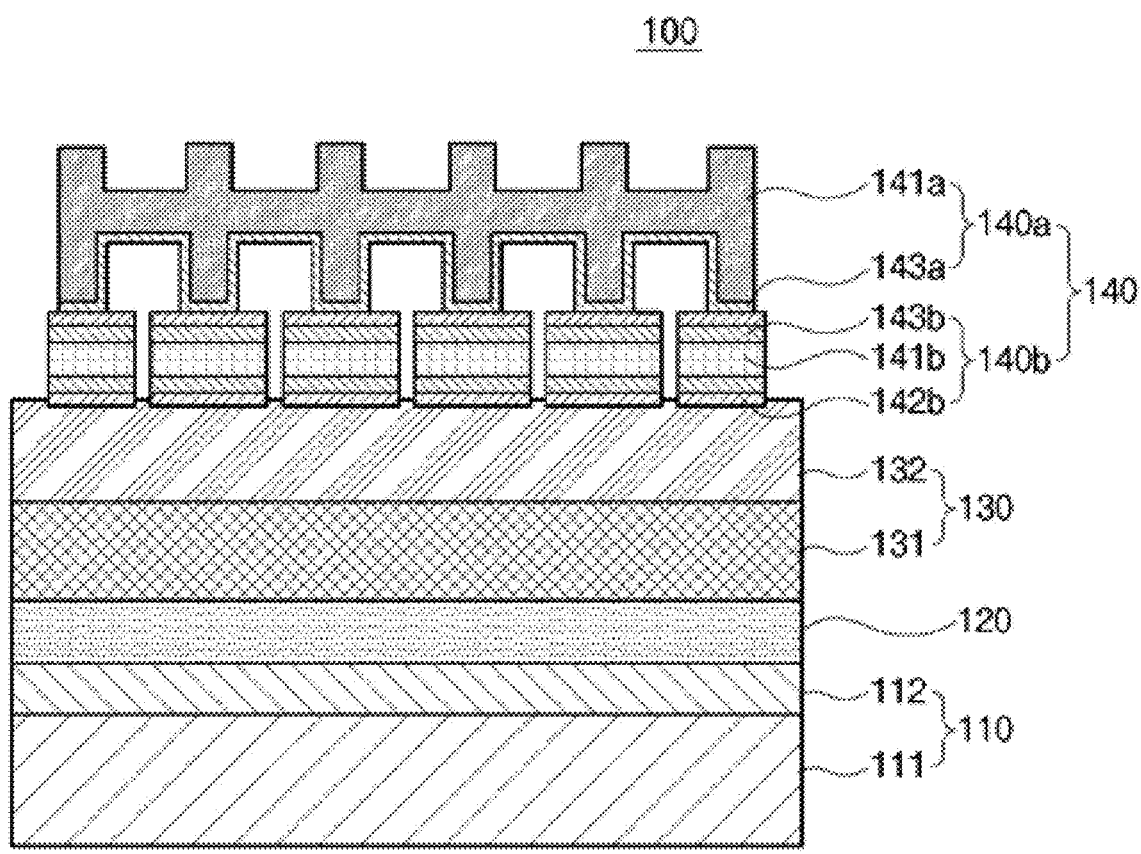
FIG. 1 is a cross-sectional view illustrating a solid oxide fuel cell according to an embodiment of the present disclosure.

Hereinafter, embodiments of the present disclosure will be described in detail with reference to the attached drawings. Since the present disclosure may be variously changed and take various forms, specific embodiments are illustrated in the drawings, and the present disclosure is described in detail in the specification. However, this is not intended to limit the present disclosure to a specific disclosure form and should be understood to include all changes, equivalents, and substitutes included in the idea and technical scope of the present disclosure. While describing respective drawings, similar reference numerals are used for similar components. In the attached drawings, the dimensions of structures are enlarged from actual sizes for the sake of clarity of the present disclosure.

Terms, such as first and second may be used to describe various components, but the components should not be limited by the terms. The above terms are used only for the purpose of distinguishing one component from another. For example, a first component may be referred to as a second component, and similarly, the second component may also be referred to as the first component without departing from the scope of the present disclosure.

Terms used in the present disclosure are only used to describe specific embodiments and are not intended to limit the present disclosure. Singular expressions include plural expressions unless the context clearly dictates otherwise. In the present disclosure, terms, such as "comprise", "include", or "have" are intended to designate the presence of features, numbers, steps, operations, configuration elements, components, or combinations thereof described in the present disclosure, and should be understood that the terms do not exclude in advance the presence or possibility of addition of one or more other features, numbers, steps, operations, configuration elements, components or combinations thereof.

Unless otherwise defined, all terms used herein, including technical or scientific terms, have the same meaning as commonly understood by those skilled in the art to which the present disclosure pertains. Terms that are commonly used and defined in the dictionary should be interpreted as having a meaning consistent with the meaning in the context of the related technology, and should not be interpreted in an ideal or excessively formal sense unless clearly defined in the present disclosure.

FIG. 1 is a cross-sectional view illustrating a solid oxide fuel cell according to an embodiment of the present disclosure.

Referring to FIG. 1, a solid oxide fuel cell 100 according to an embodiment of the present disclosure may include an anode electrode layer 110, a solid oxide electrolyte layer 120, a cathode electrode layer 130, and a current collecting member 140.

The anode electrode layer 110 may have a porous structure through which hydrogen-containing fuel may move into the anode electrode layer 110 and may be formed of a cermet including a transition metal and an ion-conducting oxide. For example, the anode electrode layer 110 may be formed of a cermet including nickel (Ni) and Yttria-stabilized zirconia (YSZ).

In one embodiment, the anode electrode layer 110 may include an anode support layer 111 and an anode functional layer 112.

The anode support layer 111 may increase the strength of a single cell in which the anode electrode layer 110, the solid oxide electrolyte layer 120, and the cathode electrode layer 130 are stacked, and may have a thickness greater than the anode functional layer 112, and may have a porous structure such that a hydrogen-containing fuel gas may move therein, and may be formed of a cermet including nickel and YSZ. In one embodiment, the anode support layer 111 may be formed of a support body raw material powder including YSZ powder of about 30 to about 60 parts by weight and nickel oxide powder of about 40 to about 70 parts by weight.

In one embodiment, the anode support layer 111 may be formed by mixing the support body raw material powder with a pore forming agent, dispersing a mixture of the support body raw material powder and the pore forming agent into a solvent, and adding a binder to the mixture to manufacture a slurry for forming a support body, and then by performing a compression molding process or a tape casting process using the slurry for forming the support body. In this case, the pore forming agent may include powder, such as polymethyl methacrylate (PMMA), activated carbon, carbon black, graphite, or starch, and the slurry for forming the support body may include YSZ powder of about 30 to about 60 parts by weight, nickel oxide powder of about 40 to about 70 parts by weight, and the pore forming agent of about 1 to 20 parts by weight. In addition, the binder may include a polyvinyl alcohol (PVA)-based binder, a methylcellulose (MC)-based binder, a sodium carboxymethylcellulose (CMC)-based binder, or a mixture of two or more thereof and may be mixed in an amount of about 10 vol. % to about 50 vol. % compared to the first raw material powder. Also, water, for example, distilled water or deionized (DI) water, may be used as the solvent.

The anode functional layer 112 may be placed on the anode support layer 111 and may be formed with a relatively dense structure compared to the anode support layer 111. In one embodiment, the anode functional layer 112 may be formed of a cermet including YSZ and nickel. For example, the anode functional layer 112 may be formed by forming a mixed slurry of nickel oxide powder and YSZ powder, forming a coating layer on the anode support layer 111 by using a dip coating method, drying the coating layer, and then sintering the coating layer in the atmosphere of about 900° C. to about 1,200° C. In contrast to this, the anode functional layer 112 may also be combined with the anode support layer 111 by being formed as a green sheet through a tape casting process and then through sintering.

The above solid oxide electrolyte layer 120 may be placed on the anode functional layer 112, may be formed of YSZ, and may be formed with a denser structure than the anode support layer 111. For example, YSZ of the solid oxide electrolyte layer 120 may contain about 5 to about 10 mol % of yttria.

In one embodiment, the anode electrode layer 110 and the solid oxide electrolyte layer 120 bonded thereto may be formed by forming a green sheet through a tape casting process using YSZ slurry, stacking the green sheet on the green sheet of the anode electrode layer 110, and sintering the green sheets. In contrast to this, the solid oxide electrolyte layer 120 may also be formed by forming an electrolyte coating layer on an outer surface of the anode functional layer 112 by using a dip coating method using the YSZ slurry and then by sintering the electrolyte coating layer in the atmosphere at about 1300° C. to about 1500° C.

The cathode electrode layer 130 may be placed on the solid oxide electrolyte layer 120 and have a porous structure such that oxygen may move therein and may be formed of a metal oxide material with ionic conductivity and electronic conductivity.

In one embodiment, the cathode electrode layer 130 may include a first cathode electrode layer 131 on the solid oxide electrolyte layer 120 and a second cathode electrode layer 132 on the first cathode electrode layer 131.

In one embodiment, the first cathode electrode layer 131 may be formed of a different material from the second cathode electrode layer 132. For example, in order to prevent the cathode electrode 130 and the solid oxide electrolyte layer 120 from being separated from each other during a sintering process, the first cathode electrode layer 131 may be formed of a material having a less thermal expansion coefficient than the second cathode electrode layer 132. Although La0.6Sr0.4CoO3-δ (LSC) has higher ion conductivity and superior catalytic activity than La0.58Sr0.4Co0.2Fe0.8O3-δ (LSCF), LSC has a relatively large thermal expansion coefficient of about $20 \times 10^{-6}$ to $23 \times 10^{-6}$/K, and when the LSC is stacked on the solid oxide electrolyte layer 120 formed of YSZ and is sintered, a problem may occur in which an LSC layer is peeled off from the solid oxide electrolyte layer 120 due to a difference in thermal expansion coefficient. In order to compensate for the mismatch of the thermal expansion coefficients of the LSC and the solid oxide electrolyte 120, the first cathode electrode layer 131 may be formed of La1-xSrxMnO3 (LSM) or LSCF, and the second cathode electrode layer 132 may be formed of LSC (here, x and δ are real numbers greater than or equal to 0 and less than 1). When the LSCF and the LSC are respectively applied as a material of the first cathode electrode layers 131 and a material of the second cathode electrode layer 132, the problem of peeling of the solid oxide electrolyte layer 120 and the cathode electrode layer 130 that occurs during a manufacturing process may be solved, while the electrode performance of the cathode electrode layer 130 may be increased.

In one embodiment, the second cathode electrode layer 132 may have a surface hardness less than a surface hardness of the first cathode layer 131. In this case, it is possible to prevent cracks that may be generated in a single cell during a pressurization manufacturing process for bonding the current collecting member 140 to the cathode electrode layer 130, to increase the uniformity of surface contact between the current collecting member 140 and the cathode electrode layer 130, and to increase the ability to capture chromium (Cr) accompanying the flow of air. For example, under the conditions of a load of 0.01 kgf and a holding time of 10 seconds, the first cathode electrode layer 131 may have Vickers hardness of about 48 to 57, while the second cathode electrode layer 132 may have Vickers hardness of about 10 to 20, for example, about 15 to 18, under the same conditions. hardness of the second cathode electrode layer 132 may be adjusted by changing sintering conditions for forming the second cathode electrode layer 132. For example, by applying cathode slurry for forming the second cathode electrode layer 132 on the first cathode electrode layer 131 formed of a complete sintering body to form a cathode slurry layer and then pre-sintering the cathode slurry layer, the second cathode electrode layer 132 having relatively low hardness and relatively high softness may be formed. In the present specification, the complete sintering means sintering a sintering target by applying a sintering temperature, pressure, or time such that density of the sintering target is 98% or more of the theoretical density, and pre-sintering means, while necking occurs between particles of a sintering target but sintering the sintering target by applying a sintering temperature, pressure, or time such that density of the sintering target is about 70% to about 95% of the theoretical density because there are many pores inside the sintering target.

In one embodiment, when the first cathode electrode layer 131 is formed of LSCF and the second cathode electrode layer 132 is formed of LSC, the first cathode electrode layer 131 may be formed by applying LSCF slurry on the solid electrolyte layer 120 or stacking LSCF green sheets and then completely sintering in pressurization state, and then the second cathode electrode layer 132 may be formed by applying LSC slurry on the first cathode electrode layer 131 and then pre-sintering the LSC slurry at a temperature lower than the complete sintering temperature of LSC, for example, at a temperature at which shrinkage of a LSC slurry layer is about 1% to about 3%, or at a sintering time less than the time for complete sintering. The pre-sintering temperature at which the shrinkage of the LSC slurry layer is about 1% to about 3% may be about 900° C. to about 1000° C.

The current collecting member 140 may be placed on the second cathode electrode layer 132 to be in contact with the second cathode electrode layer 132 and may be formed of an electrically conductive material, for example, metal or an alloy.

In one embodiment, the current collecting member 140 may include a current collecting mesh structure 140*b* arranged between a separation plate 140*a* and the second cathode electrode layer 132 to increase electrical connectivity of the separation plate 140*a* and the second cathode electrode layer 132.

In one embodiment, the separation plate 140*a* may include a first metal member 141*a* and a first chromium collection layer 143*a* covering at least a part of a surface of the first metal member 141*a*. In addition, the current collecting mesh structure 140*b* may include a second metal member 141*b* and a coating layer 142*b* coated on at least a part of a surface of the second metal member 141*b*, and the coating layer 142*b* may be formed of the same material as a material forming the second cathode electrode layer 132 and have hardness similar to hardness of the second cathode electrode layer 132. For example, the hardness of the coating layer 142*b* may be about 0.7 to about 1.2 times the hardness of the second cathode electrode layer 132. In one embodiment, when the second cathode electrode layer 132 and the coating layer 142*b* are formed of LSC, the coating layer 142*b* may be formed by applying LSC slurry onto a surface of the second metal member 141*b* and then pre-sintering the LSC slurry, that is heat-treating the LSC slurry at a temperature of, for example, about 600° C. to about 800° C. When the current collecting mesh structure 140*b* includes the coating layer 142*b*, the electrical contact resistance between the current collecting member 140 and the second cathode electrode layer 132 may be reduced by the coating layer 142*b* with relatively low hardness and high softness, and cracks of single cells may be prevented more stably by the current collecting member 140, and also, the coating layer 142*b* may prevent chromium contained in the second metal member 141*b* from diffusing into the cathode electrode layer 130. Meanwhile, the current collecting mesh structure (140b) may further include a second chromium collection layer (143b) formed between the second metal member (141b) and the coating layer (142b).

Meanwhile, due to the physical characteristics of the second cathode electrode layer 132 with relatively low hardness, at least a part of the current collecting mesh structure 140b may be buried in the second cathode electrode layer 132.

Figure 2:
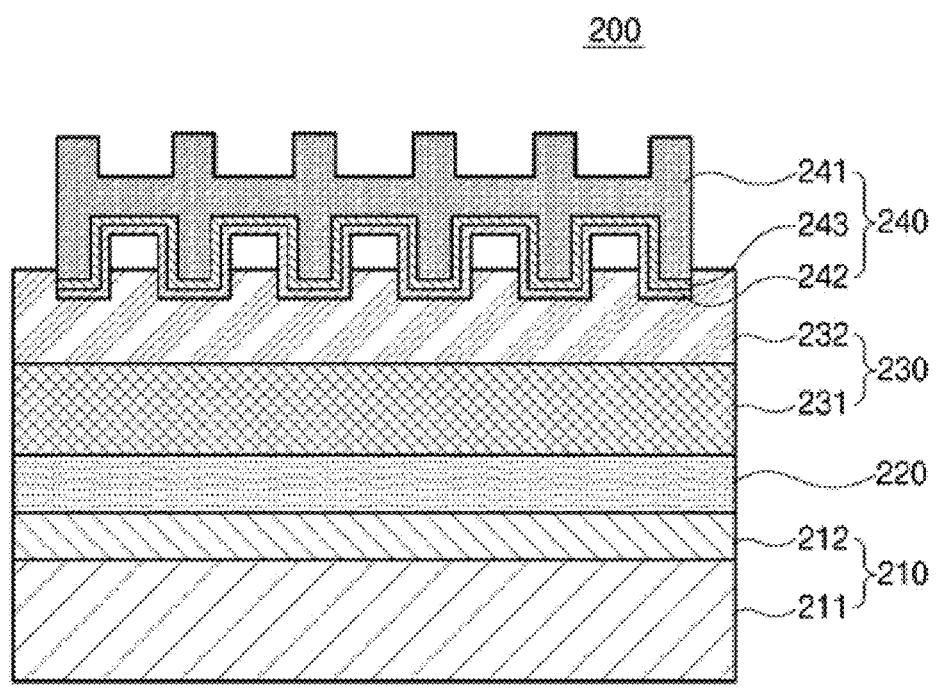
FIG. 2 is a cross-sectional view illustrating a solid oxide fuel cell according to another embodiment of the present disclosure.

FIG. 2 is a cross-sectional view illustrating a solid oxide fuel cell according to another embodiment of the present disclosure.

Referring to FIG. 2, a solid oxide fuel cell 200 according to another embodiment of the present disclosure may include an anode electrode layer 210, a solid oxide electrolyte layer 220), a cathode electrode layer 230, and a current collecting member 240.

The anode electrode layer 210, the solid oxide electrolyte layer 220, and the cathode electrode layer 230 are respectively and substantially the same as the anode electrode layer 110, the solid oxide electrolyte layer 120, and the cathode electrode layer 130 of the solid oxide fuel cell 100 described above with reference to FIG. 1, and accordingly, redundant descriptions thereof are omitted.

Unlike the current collecting member 140 illustrated in FIG. 1, the current collecting member 240 may include only a separation plate without a current collecting mesh structure. In the current collecting member 240 that is the separation plate, a protruding portion forming a flow path may be formed on one surface of the separation plate that faces the second cathode electrode layer 232, and an end of the protruding portion may be buried in the second cathode electrode layer 232 due to physical characteristics of the second cathode electrode layer 232 with relatively low hardness. For example, the protruding portion may include a rib that forms a flow path for uniformly supplying air to the cathode electrode layer 230.

In one embodiment, the current collecting member 240 may include a metal member 241 and a coating layer 242 coated on at least a part of a surface of the metal member 241, and the coating layer 242 may be formed of the same material as a material forming the second cathode electrode layer 232 and may have hardness similar to hardness of the second cathode electrode layer 232. For example, the hardness of the coating layer 242 may be about 0.7 to 1.2 times the hardness of the second cathode electrode layer 232. In one embodiment, when the second cathode electrode layer 232 and the coating layer 242 are formed of LSC, the coating layer 242 may be formed by applying LSC slurry onto a surface of the metal member 241 and then heat-treating the LSC slurry at a temperature of, for example, about 600° C. to about 800° C. so as to be sintered. When the current collecting member 240 includes the coating layer 242, the electrical contact resistance between the current collecting member 240 and the second cathode electrode layer 232 may be reduced by the coating layer 242 with relatively low hardness and high softness, and cracks of the single cells may be more stably prevented by the current collecting member 240, and the coating layer 242 may also prevent chromium contained in the metal member 241 from diffusing into the cathode electrode layer 230. Meanwhile, the current collecting member 240 may further include a chromium capture layer 243 formed between the metal member 241 and the coating layer 242.

Figure 3:
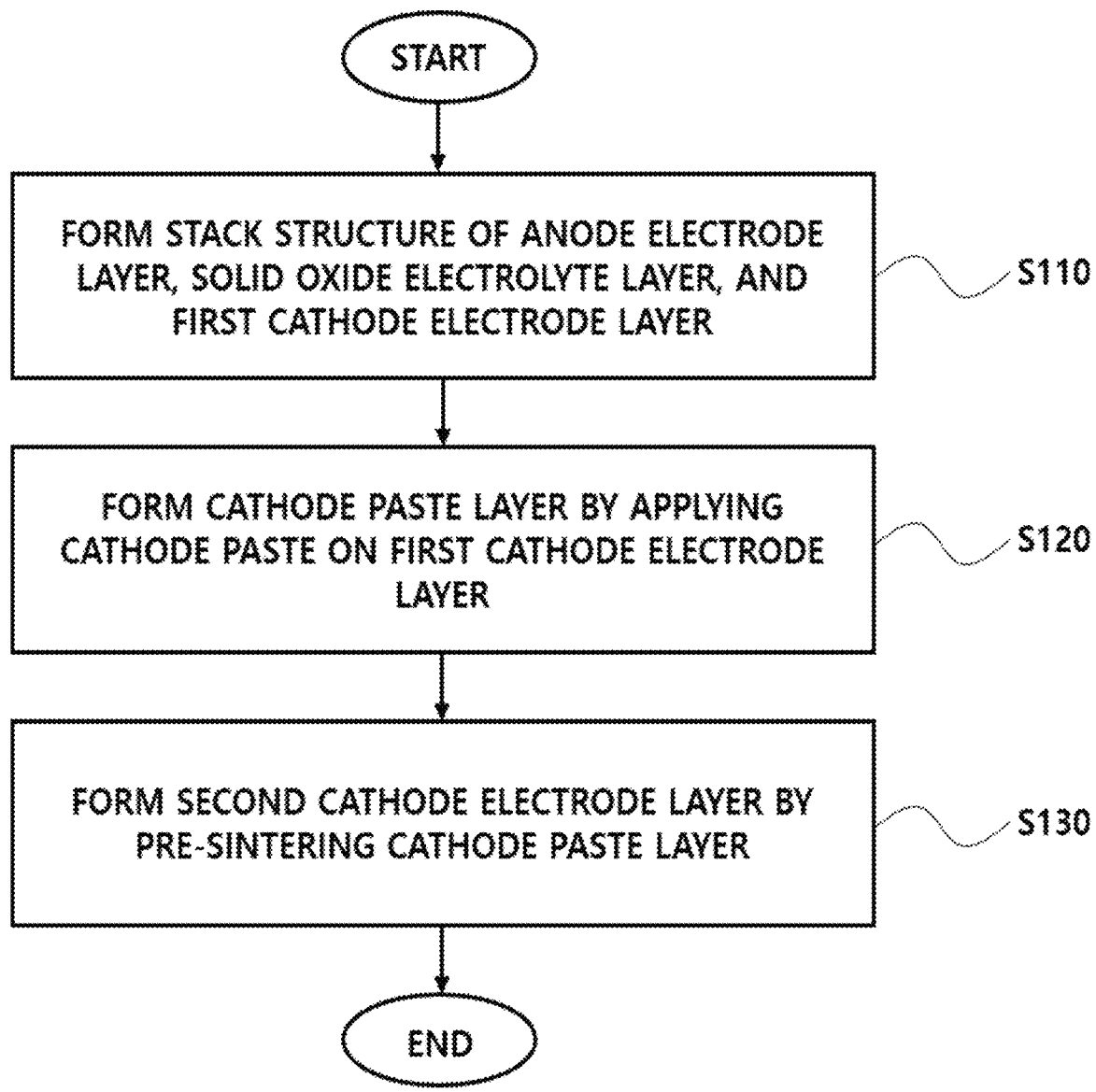
FIG. 3 is a flow chart illustrating a method of manufacturing a solid oxide fuel cell, according to an embodiment of the present disclosure.

FIG. 3 is a flowchart illustrating a method of manufacturing a solid oxide fuel cell, according to an embodiment of the present disclosure.

Referring to FIG. 3 together with FIG. 1 and FIG. 2, the method of manufacturing the solid oxide fuel cells 100 and 200, according to the embodiment of the present disclosure may include a first step S110 of forming a stack structure of the anode electrode layer 110 or 210, the solid oxide electrolyte layer 120 or 220, and the first cathode electrode layer 131 or 231, a second step S120 of forming a cathode slurry layer by applying cathode slurry on the first cathode electrode layer 131 or 231, and a third step S130 of forming the second cathode electrode layer 132 or 232 by pre-sintering the cathode slurry layer.

In the first step S110, a method of forming the stack structure of the anode electrode layer 110 or 210, the solid oxide electrolyte layer 120 or 220, and the first cathode electrode layer 131 or 231 is not limited in particular.

In one embodiment, the stack structure may be formed by sequentially stacking an anode electrode green sheet, a solid oxide electrolyte green sheet, and a cathode electrode green sheet, and then sintering the stacked green sheets. In another embodiment, the stack structure may be formed by stacking the anode electrode green sheet and the solid oxide electrolyte green sheet and then performing first sintering of the stacked green sheets, and stacking the cathode electrode green sheet on the solid oxide electrolyte layer 120 or 220 formed by performing the first sintering and then performing second sintering of the stacked cathode electrode green sheet and the solid oxide electrolyte layer 120.

The anode electrode green sheet may be made by forming a support body green sheet through a tape casting process using a support body molding slurry containing support body raw material powder, a pore forming agent, and a binder, and then applying a mixed slurry of nickel oxide powder and YSZ powder on a surface of the support body green sheet. In addition, the solid oxide electrolyte green sheet may be made through a tape casting process using YSZ powder slurry, and the cathode electrode green sheet may be made through a tape casting process using LSCF or LSM powder slurry.

In the second step S120, a cathode slurry layer may be formed by applying LSC powder slurry onto a surface of the first cathode electrode layer 131 or 231 of the stack structure. The method of applying the LSC powder slurry onto the surface of the first cathode electrode layer 131 or 231 is not limited in particular. For example, the cathode slurry layer may be formed by applying the LSC powder slurry onto the surface of the first cathode electrode layer 131 or 231 through the coating process.

In the third step S130, by pre-sintering the cathode slurry layer, the second cathode electrode layer 132 or 232 with relatively low hardness and relatively high softness may be formed. The pre-sintering of the cathode slurry layer may be performed by controlling a sintering temperature, pressure, or time such that the density of the second cathode electrode layer 132 or 232 formed through the pre-sintering is about 70% to about 95% of the theoretical density. In one embodiment, the second cathode electrode layer 132 or 232 may be sintered to have Vickers hardness of about 10 to about 20, for example, about 15 to about 18, under the conditions of a load of 0.01 kgf and a holding time of 10 seconds.

The solid oxide fuel cell manufactured as described above may be a single cell and may constitute a fuel cell stack by stacking single cells by using the current collecting member 140 or 240. In this case, the current collecting member 140 or 240 may be a combination of the separation plate 140a and the current collecting mesh structure 140b illustrated in FIG. 1 or may be only the separation plate 240 illustrated in FIG. 2.

In the process of forming the fuel cell stack, bonding characteristics between the anode electrode layer 110 or 210 of the single cell and the current collecting member 140 or 240 and between the cathode electrode layer 130 or 230 of the single cell and the current collecting member 140 or 240 may be improved by alternately stacking the single cell and the current collecting member 140 or 240 and then performing a pressurization process. In this case, as in the present disclosure, when the second cathode electrode layer 132 or 232 in contact with the current collecting member 140 or 240 is formed to have relatively low hardness and relatively high softness, a part of the current collecting member 140 or 240 may penetrate into the second cathode electrode layer 132 or 232 during the pressurization process, and thus, the bonding characteristics of the current collecting member 140 or 240 and the second cathode electrode layer 132 or 232 may be significantly improved. In addition, when the second cathode electrode layer 132 or 232 is formed to have relatively low hardness and relatively high softness, the second cathode electrode layer 132 or 232 may absorb some of the impact or pressure as described above, and thus, cracks of any of the cathode electrode layer 130 or 230, the solid oxide electrolyte layer 120 or 220, and the anode electrode layer 110 or 210 may be prevented.

According to a solid oxide fuel cell of the present disclosure and a method of manufacturing the solid oxide fuel cell, by forming two or more cathode electrode layers and forming the outermost cathode electrode layer to have relatively low hardness and relatively high softness, not only the contact characteristics of the cathode electrode layers and a current collecting member may be improved, but also cracks of any of the cathode electrode layers, a solid oxide electrolyte layer, and an anode electrode layer due to impacts applied by a current collecting member during a manufacturing process or an operation may be prevented, and an improved chromium capture capability may be achieved.

Although the present disclosure is described above with reference to preferred embodiments, it will be understood by those skilled in the art that various modifications and changes may be made to the present disclosure without departing from the idea and scope of the present disclosure set forth in the claims below.

What is claimed is:

1. A solid oxide fuel cell comprising:
a solid oxide electrolyte layer;
an anode electrode layer placed on a first surface of the solid oxide electrolyte layer;
a first cathode electrode layer placed on a second surface of the solid oxide electrolyte layer;
a second cathode electrode layer placed on the first cathode electrode layer and having lower hardness than the first cathode electrode layer; and
a current collecting member placed on the second cathode electrode layer and in contact with the second cathode electrode layer,
wherein
the current collecting member includes a metal member, a coating layer coated on at least a region of a surface of the metal member which faces the second cathode electrode layer and a chromium capture layer formed between the metal member and the coating layer,
the coating layer is formed of the same material as the second cathode electrode layer,
the first cathode electrode layer is formed of any one of $La_{0.58}Sr_{0.4}Co_{0.2}Fe_{0.8}O_{3-\delta}$ (LSCF) and $La_{1-x}Sr_xMnO_3$ (LSM), and
the second cathode electrode layer is formed of $La_{0.6}Sr_{0.4}CoO_{3-\delta}$ (LSC), where x and $\delta$ are each independently real numbers greater than or equal to 0 and less than 1.

2. The solid oxide fuel cell of claim 1, wherein
the first cathode electrode layer has Vickers hardness of 48 to 57 under conditions of a load of 0.01 kgf and a holding time of 10 seconds, and
the second cathode electrode layer has Vickers hardness of 10 to 20.

3. The solid oxide fuel cell of claim 1, wherein
at least a part of the current collecting member is buried in the second cathode electrode layer.

4. The solid oxide fuel cell of claim 1, wherein
the metal member includes a separation plate, and
at least a part of the separation plate is buried in the second cathode electrode layer.

5. A solid oxide fuel cell comprising:
a solid oxide electrolyte layer;
an anode electrode layer placed on a first surface of the solid oxide electrolyte layer;
a first cathode electrode layer placed on a second surface of the solid oxide electrolyte layer;
a second cathode electrode layer placed on the first cathode electrode layer and having lower hardness than the first cathode electrode layer; and
a current collecting member placed on the second cathode electrode layer and in contact with the second cathode electrode layer,
wherein
the current collecting member includes a metal member, a coating layer coated on at least a region of a surface of the metal member which faces the second cathode electrode layer and a chromium capture layer formed between the metal member and the coating layer, and
the coating layer is formed of the same material as the second cathode electrode layer;
wherein
the current collecting member includes a separation plate and a current collecting mesh structure placed between the separation plate and the second cathode electrode layer,
the metal member is the current collecting mesh structure, and
at least a part of the current collecting mesh structure is buried in the second cathode electrode layer.

6. The solid oxide fuel cell of claim 1, wherein
hardness of the coating layer is 0.7 to 1.2 times hardness of the second cathode electrode layer.

* * * * *